(12) United States Patent
Roy et al.

(10) Patent No.: US 10,502,842 B2
(45) Date of Patent: Dec. 10, 2019

(54) RADIATION DETECTOR

(71) Applicants: BROOKHAVEN SCIENCE ASSOCIATES, LLC, Upton, NY (US); NORFOLK STATE UNIVERSITY, Norfolk, VA (US)

(72) Inventors: Utpal N. Roy, Ridge, NY (US); Ralph B. James, Ridge, NY (US); Giuseppe Camarda, Farmingville, NY (US); Yonggang Cui, Miller Place, NY (US); Anwar Hossain, Port Jefferson Station, NY (US); Ge Yang, Moriches, NY (US); Aswini Pradhan, Norfolk, VA (US); Rajeh Mundle, Norfolk, VA (US)

(73) Assignees: BROOKHAVEN SCIENCE ASSOCIATES, LLC, Upton, NY (US); NORFOLK STATE UNIVERSITY, Norfolk, VA (US)

( * ) Notice: Subject to any disclaimer, the term of this patent is extended or adjusted under 35 U.S.C. 154(b) by 0 days.

(21) Appl. No.: 15/549,935

(22) PCT Filed: Feb. 12, 2016

(86) PCT No.: PCT/US2016/017846
§ 371 (c)(1),
(2) Date: Aug. 9, 2017

(87) PCT Pub. No.: WO2016/130978
PCT Pub. Date: Aug. 18, 2016

(65) Prior Publication Data
US 2018/0024254 A1    Jan. 25, 2018

Related U.S. Application Data

(60) Provisional application No. 62/116,221, filed on Feb. 13, 2015.

(51) Int. Cl.
*G01T 1/24* (2006.01)

(52) U.S. Cl.
CPC .............. *G01T 1/241* (2013.01); *G01T 1/247* (2013.01)

(58) Field of Classification Search
CPC ......... H01L 31/02966; H01L 27/14678; H01L 51/442
See application file for complete search history.

(56) References Cited

U.S. PATENT DOCUMENTS

| 7,122,398 | B1* | 10/2006 | Pichler | ............... H01L 31/1876 438/66 |
| 2009/0184251 | A1* | 7/2009 | Karim | ..................... G01T 1/241 250/370.01 |

(Continued)

OTHER PUBLICATIONS

"Hardnesses of the elements (data page)," Wikipedia, accessed at http://en.wikipedia.org/wiki/Hardnesses_of_the_elements_%28data_page%29, on Aug. 7, 2017, pp. 4.

(Continued)

*Primary Examiner* — Kenneth J Malkowski
(74) *Attorney, Agent, or Firm* — Iphorizons PLLC; Narendra Reddy Thappeta (57) ABSTRACT

Technologies are described for semiconductor radiation detectors. The semiconductor radiation detectors may comprise a semiconductor material. The semiconductor material may include a first surface and a second surface. The first surface may be opposite from the second surface. The semiconductor material may include at least one metal component. The semiconductor material may be effective to absorb radiation and induce a current pulse in response thereto. The semiconductor radiation detector may comprise an electrode contact. The electrode contact may include a metal doped oxide deposited on the first surface of the (Continued)

semiconductor material. The metal doped oxide may include the metal component element of the semiconductor material.

20 Claims, 8 Drawing Sheets

(56) References Cited

U.S. PATENT DOCUMENTS

| | | | |
|---|---|---|---|
| 2010/0032579 A1* | 2/2010 | Chen | G01T 1/24 250/370.13 |
| 2013/0099225 A1* | 4/2013 | Nihei | C07D 493/06 257/40 |
| 2013/0161773 A1* | 6/2013 | Dierre | H01L 27/14601 257/428 |
| 2014/0373908 A1* | 12/2014 | Duggal | H01L 31/02966 136/256 |
| 2016/0013434 A1* | 1/2016 | Snaith | H01L 51/4226 136/252 |
| 2016/0131771 A1* | 5/2016 | Kappler | G01T 1/243 250/370.07 |
| 2017/0200526 A1* | 7/2017 | Guo | H01B 1/023 |

OTHER PUBLICATIONS

Yonenaga, I., "Thermo-mechanical stability of wide-bandgap semiconductors: high temperature hardness of SiC, AlN, GaN, ZnO and ZnSe," Elsevier Science, Physica B, vol. 308-310, pp. 1150-1152 (2001).

Sang, W., et al., "Primary study on the contact degradation mechanism of CdZnTe detectors," Elsevier Science, Nuclear Instruments and Methods in Physics Research Sec. A, vol. 527, pp. 487-492 (2004).

Ibach, H., "Thermal Expansion of Silicon and Zinc Oxide (I)," Phys. Stat. Sol. 31, pp. 625-634 (1969).

* cited by examiner

RADIATION DETECTOR

CROSS REFERENCE TO RELATED APPLICATION

This application is a 371 of International Application No. PCT/US16/17846 filed Feb. 12, 2016, which in turn claims priority to Provisional Application No. 62/116,211 filed on Feb. 13, 2015, the entirety of both of these applications is hereby incorporated by reference in their entirety.

STATEMENT OF GOVERNMENT RIGHTS

The present invention was made with government support under contract numbers DE-AC02-98CH10886 and DE-SC0012704 awarded by the U.S. Department of Energy. The United States government may have certain rights in this invention.

FIELD OF THE INVENTION

This disclosure relates generally to radiation detectors and semiconductor nuclear radiation detectors.

BACKGROUND

A radiation detector is a device used to detect radiated particles or photons. The radiation detected may be produced by particle decay, cosmic radiation, fission, or a reaction such as reactions created in a particle accelerator. Gas detectors, scintillator detectors and semiconductor detectors are three common types of nuclear radiation detectors and utilize different principles to detect radiation.

Semiconductor radiation detectors are used in a large variety of fields, including nuclear physics, X-ray and gamma ray astronomy, national security, oil and mineral exploration, and nuclear medicine. Semiconductor nuclear radiation detectors have good energy and spatial resolution, and have the capability to be integrated into compact systems for spectroscopy and imaging. Semiconductor nuclear radiation detectors may utilize detector materials such as CdZnTe and CdTe.

SUMMARY

In some examples, semiconductor radiation detectors are generally described. The semiconductor radiation detectors may comprise a semiconductor material. The semiconductor material may include a first surface and a second surface. The first surface may be opposite from the second surface. The semiconductor material may include at least one metal component. The semiconductor material may be effective to absorb radiation and induce a current pulse in response thereto. The semiconductor radiation detector may comprise an electrode contact. The electrode contact may include a metal doped oxide deposited on the first surface of the semiconductor material. The metal doped oxide may include the metal component element of the semiconductor material.

In some examples, semiconductor radiation detector systems are described. The semiconductor radiation detector system may comprise a semiconductor material. The semiconductor material may have a first surface and a second surface. The first surface may be opposite from the second surface. The semiconductor material may include at least one metal component. The semiconductor material may be effective to absorb radiation and induce a current pulse in response thereto. The semiconductor radiation detector system may comprise a readout circuit. The semiconductor radiation detector system may comprise at least one first electrode contact attached to the first surface. The semiconductor radiation detector system may comprise at least one second electrode contact attached to the second surface. The first electrode contact and the second electrode contact may be conductively connected to the readout circuit. The first electrode contact may include a metal doped oxide. The oxide may include an oxide of the metal component of the semiconductor material.

In some examples, methods of making a radiation detector are generally described. The methods may comprise receiving a semiconductor material. The semiconductor material may have a first surface and a second surface. The first surface may be opposite from the second surface. The semiconductor material may include at least one metal component. The semiconductor material may be effective to absorb radiation and induce a current pulse in response thereto. The methods may comprise depositing a metal doped oxide on the first surface of the semiconductor material. The oxide may include a component element of the semiconductor material. The methods may comprise depositing the metal doped oxide on the second surface of the semiconductor material.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

all arranged according to at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

As used herein, any compound, material or substance which is expressly or implicitly disclosed in the specification and/or recited in a claim as belonging to a group or structurally, compositionally and/or functionally related compounds, materials or substances, includes individual representatives of the group and all combinations thereof.

Figure 1:
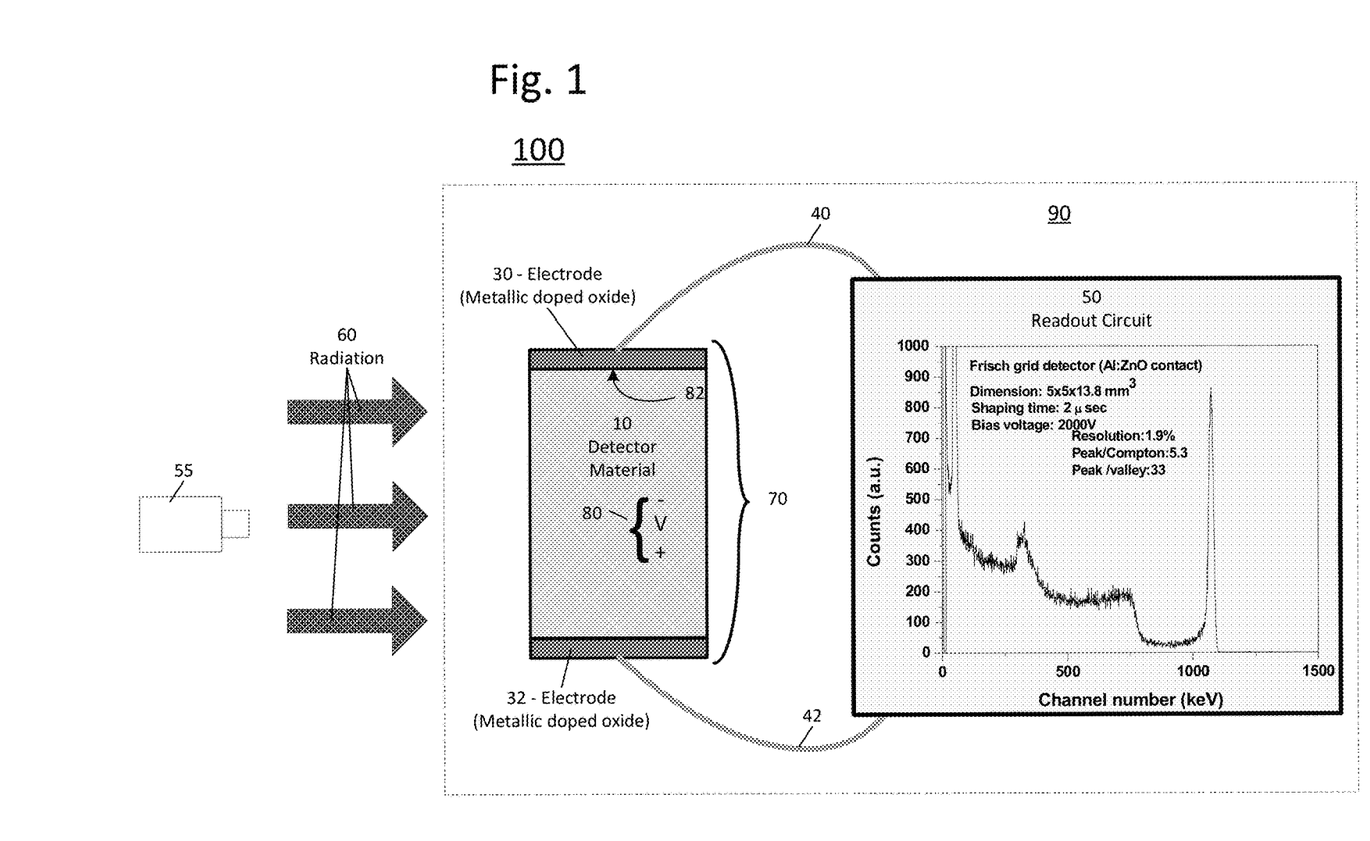
FIG. 1 is a system drawing illustrating a side view of a radiation detector system utilizing an electrode contact for a radiation detector.

FIG. 1 is a system drawing illustrating an example radiation detector system 100 utilizing an electrode contact for a radiation detector, arranged in accordance with at least some embodiments presented herein. Radiation detector system 100 may include radiation detector 90 and radiation generator 55. Radiation detector 90 may include detector material 10, electrode contact 30, electrode contact 32, signal carrier 40, signal carrier 42, and readout circuit 50, which all may be arranged in electrical communication with each other. A geometry of radiation detector 90 may be a Frisch-grid, hemispherical, co-planar grid, or multi-pixel detector configuration. Electrode contacts 30, 32 attached to detector material 10 may form a detector unit 70. Radiation generator 55 may be effective to generate radiation 60. As discussed in more detail below, radiation generator 55 may direct radiation 60 towards radiation detector 90 and radiation detector material 10. Radiation 60 directed at radiation detector material 10 may induce an electrical signal 80 within radiation detector material 10. Electrical signal 80 may be measured with use of electrode contacts 30, 32 and signal carriers 40, 42 and a representation of electrical signal 80 may be subsequently measured and displayed by readout circuit 50.

Detector material 10 may be a semiconductor, and may be a material selected so as to induce a current pulse or electrical signal 80 in response to absorbing or scattering radiation 60. Detector material 10 may be a material with a relatively wide band gap and a relatively high resistivity. For example, detector material 10 may be CdZnTe, thallium bromide, CdMnTe, CdTeSe, CdZnTeSe, CdTe, Si, Ge, HgI$_2$, CdTe-based alloys, CdSe-based alloys, GaAs, a-Se, PbI$_2$, AlSb, InP, ZnSe, ZnTe, PbO, BiI$_3$, SiC, Hg$_x$Br$_{(1-x)}$I$_2$, Hg$_x$Cd$_{(1-x)}$I$_2$, InI$_2$, Ga$_2$Se$_3$, Ga$_2$Te$_3$, TlPbI$_3$, Tl$_4$, HgI$_6$, Tl$_3$As$_2$Se$_3$, TlGaSe$_2$, and AgGaTe$_2$. Detector material 10 may be used in a radiation detector 90, or radiation detector system 100, such as a semiconductor nuclear radiation detector, a gaseous ionization detector, a scintillating detector, a positron emission tomography (PET) system, a single-photon emission computed tomography (SPECT) system or an X-ray radiography system.

Electrode contacts 30, 32 may each include an oxide that has been doped with a metal. Oxides may include one of zinc, cadmium or zinc plus cadmium. Dopants may include aluminum, indium and silver. For example, electrode contacts 30, 32 may be aluminum-doped zinc-oxide (ZnO), tin-doped indium oxide (indium tin oxide (ITO), or aluminum-doped cadmium oxide (CdO). In an example, electrode contacts 30, 32 may be aluminum-doped ZnO and detector material 10 may be CdZnTe. In another example, electrode contacts 30, 32 may be aluminum-doped cadmium oxide (Al:CdO) and detector material 10 may be CdZnTe. Electrode contacts 30, 32 may be cathode and anode electrodes respectively and may make Ohmic connections or Schottky connections. For example, electrode 30 may be made of the same material as electrode 32 and form Ohmic connections with readout circuit 50. In another example, electrode 30 may be made of a different material from electrode 32 and form Schottky connections with readout circuit 50. Electrode contacts 30, 32 may be used in a radiation detector 90, or a radiation detector system 100, such as a semiconductor nuclear radiation detector, a gaseous ionization detector, a scintillating detector, a positron emission tomography (PET) system, a single-photon emission computed tomography (SPECT) system or an X-ray radiography system.

As shown below in Table 1, the thermal expansion coefficient of an electrode contact 30, 32 including ZnO is closer to that of detector material 10 including CdZnTe when compared to other metals used as electrode contact 30 in detector applications. Electrode contact 30 including ZnO and detector material 10 including CdZnTe may have relatively close thermal expansion coefficients which may contribute to mechanical stability in electrode contacts 30, 32 formed on detector material 10. Mechanical stability in electrode contacts 30, 32 including ZnO formed on detector material 10 including CdZnTe may prevent the performance of radiation detector 90 from deteriorating over time.

TABLE 1

| Material | CdZnTe | Gold | Aluminum | Indium | Platinum | Zinc oxide |
|---|---|---|---|---|---|---|
| Vickers hardness | — | 216 MPa[1] | 167 MPa[1] | — | 549 MPa[1] | 47 GPa[2] |
| Thermal expansion coefficient | 4.8[3] ($10^{-6}$/C.) | 14.4[3] ($10^{-6}$/C.) | 23.8[3] ($10^{-6}$/C.) | 32.1[3] ($10^{-6}$/C.) | 8.9[3] ($10^{-6}$/C.) | ⊥c 4.7[4] ∥c 2.9 ($10^{-6}$/K) |

Electrode contacts 30, 32 including ZnO may include about 8-20 times greater hardness than metal electrode contacts 30, 32 including metals such as gold, aluminum, indium, and platinum. Gold, aluminum, indium, and platinum used for electrode contacts 30, 32 may be soft and prone to scratches during fabrication and handling, which can degrade detector performance. Electrode contacts 30, 32 including ZnO may be more rugged for fabrication and handling during processing of radiation detector 90 than metal electrode contacts 30, 32. Less material from electrode contacts 30, 32 including ZnO may defuse into detector material 10 compared to metal electrode contacts 30, 32.

Electrode contact 30 including ZnO may be an oxide of one of a component element of detector material 10. For example, when detector material 10 is CdZnTe, electrode contact 30 including ZnO may be an oxide of Zn, a component element of CdZnTe. Electrode 30 and detector material 10 may be in contact at an interface 82. Electrode contact 30 including ZnO may have increased contact stability at interface 82 with detector material 10 including CdZnTe when compared to other metals that may be used as electrode contact 30 in detector applications. Chemical bonding between electrode contact 30 including ZnO and detector material 10 CdZnTe may provide contact stability at interface 82. Chemical bonding between electrode contact 30 and detector material 10 may reduce the likelihood that new defects will be formed at interface 82. Defects at the interface 82 may be detrimental to charge transport across interface 82 and may contribute to a space-charge effect that can cause polarization of detector material 10 and instability of radiation detector 90 over time. Electrode contact 30 including ZnO may be stable environmentally due to the low reactivity of zinc oxide with the composition of air.

Signal carrier 40 may conductively connect from electrode contact 30 to an input of readout circuit 50. Signal carrier 42 may conductively connect from electrode contact 32 to an input of readout circuit 50. Signal carriers 40, 42 may include wire bonding and may route individual wires from electrode contacts 30, 32 respectively to inputs of readout circuit 50. Signal carriers 40, 42 may include a flexible cable and may include conductor wires pre-routed and embedded on a soft substrate. Signal carriers 40, 42 may include directed connections to a printed circuit board (PCB) where readout circuit 50 may reside. A physical connection between electrode contacts 30, 32 and respective signal carriers 40, 42 may be established by a conductive epoxy, an indium-bump-bond process, or a soldering process.

Figure 2A:
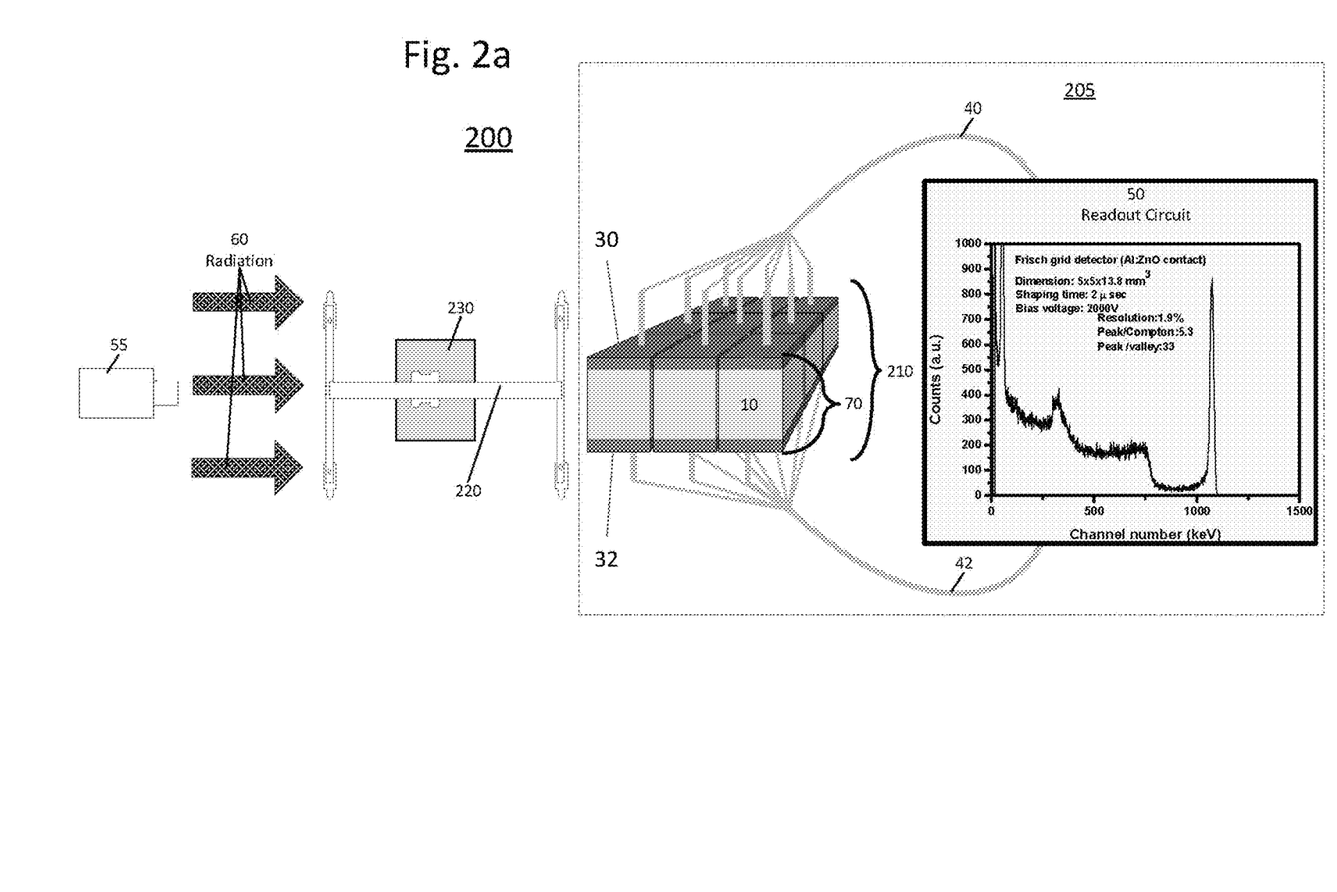
FIG. 2a is a system drawing illustrating an example radiation detector system utilizing a gantry and an array of detectors and electrode contacts for a radiation detector.

FIG. 2a illustrates an example radiation detector system 200 utilizing a gantry and an array of detectors and electrode contacts for a radiation detector, all arranged in accordance with at least some embodiments presented herein. Those components in FIG. 2a that are labeled identically to components of FIG. 1 will not be described again for the purposes of clarity.

Radiation detector system 200 may include radiation detector 205 and a gantry 220. Radiation detector 205 may include an array 210 of radiation detector units 70 or monolithic semiconductor crystals with radiation detector units formed by pixels. Array 210 may be a linear array, and may include an array of detector units 70. Each detector unit 70 may include radiation detector material 10 between electrode contacts 30 and 32. Signal carrier 40 may connect from each electrode contact 30 in array 210 to an input of readout circuit 50. Signal carrier 42 may connect from each electrode contact 32 in array 210 to an input of readout circuit 50.

Gantry 220 may be a movable framework that supports and maneuvers a test subject 230 or a test sample 230 for radiation detector system 200. Gantry 220 may allow for a test subject 230 or test sample 230 to be maneuvered within radiation 60 directed toward array 210 from radiation generator 55. For example, gantry 220 may be used during medical imaging of test subject 230.

Figure 2B:
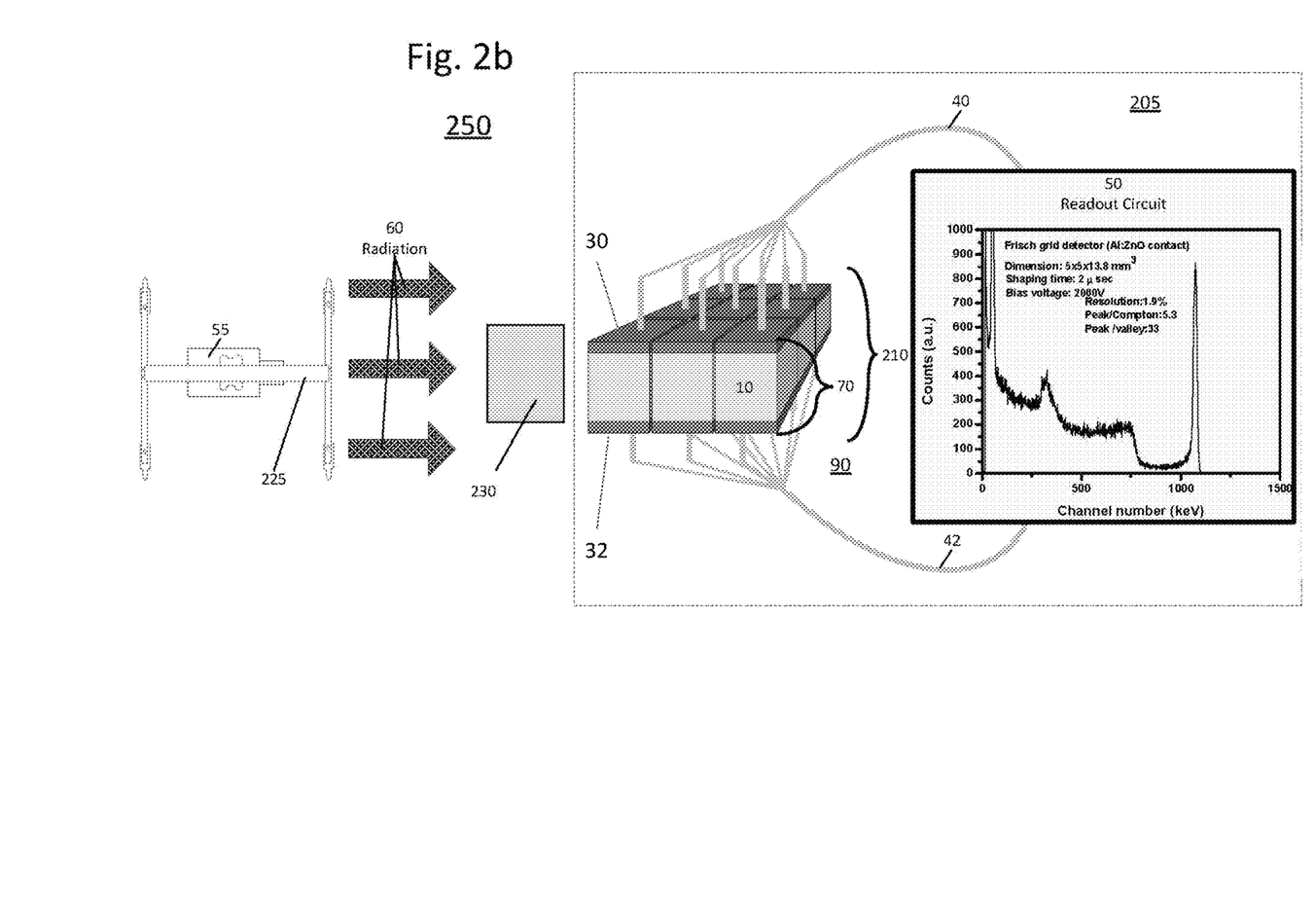
FIG. 2b is a system drawing illustrating an example radiation detector system utilizing a radiation generator supported by a gantry and an array of detectors and electrode contacts for a radiation detector.

FIG. 2b illustrates an example radiation detector system 250 utilizing a radiation generator supported by a gantry and an array of detectors and electrode contacts for a radiation detector, all arranged in accordance with at least some embodiments presented herein. Those components in FIG. 2b that are labeled identically to components of FIGS. 1-2a will not be described again for the purposes of clarity.

Radiation detector system 250 may include a gantry 225 supporting radiation generator 55. Gantry 225 may be a movable framework for supporting radiation generator 55. Gantry 225 may allow for control of a direction of radiation generated by supported radiation generator 55 towards a test subject 230 and array 210 during radiation detection by radiation detector system 250.

Figure 3:
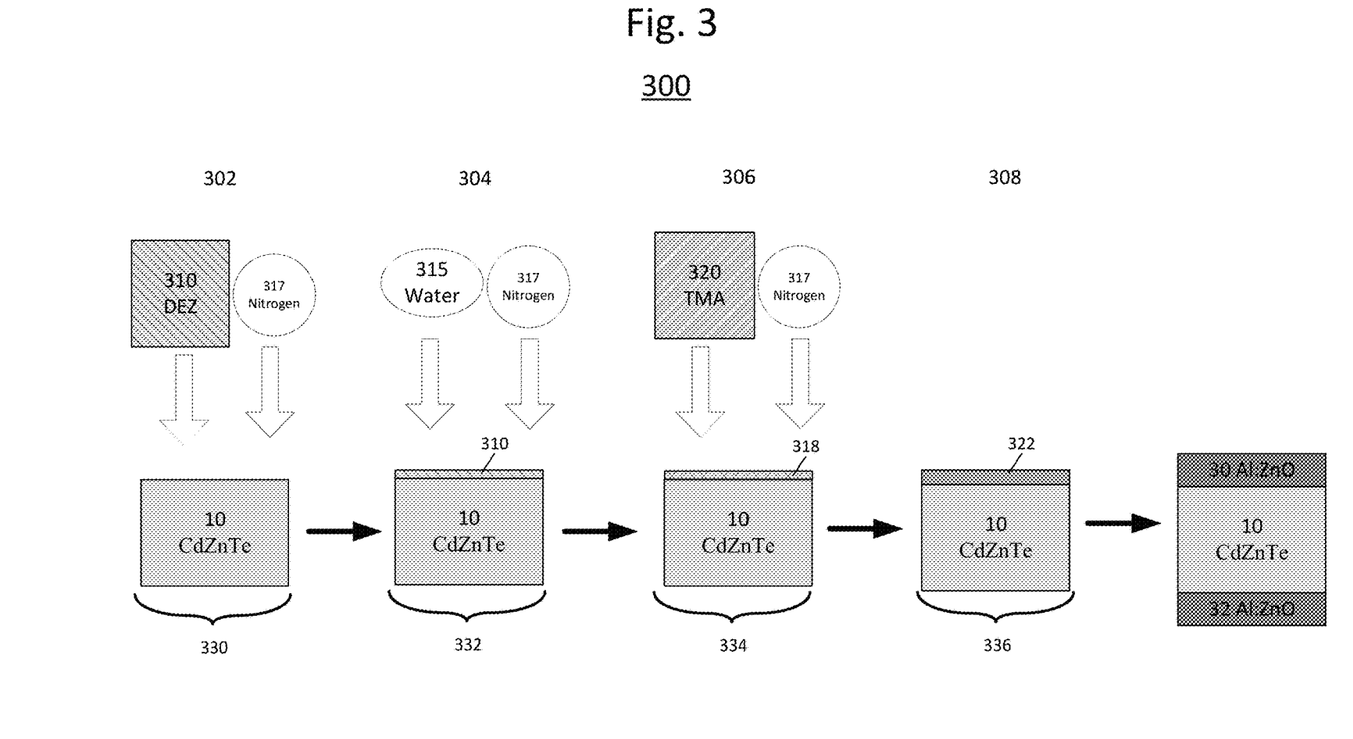
FIG. 3 is a system drawing of a method to form a radiation detector.

FIG. 3 is a system drawing of a method to form a radiation detector, arranged in accordance with at least some embodiments presented herein. Those components in FIG. 3 that are labeled identically to components of FIG. 1-2b will not be described again for the purposes of brevity. An electrode contact 30 including ZnO may be formed on detector material 10 by, for example, atomic layer deposition (ALD), chemical vapor deposition, laser ablation, or a sputtering deposition. ALD may provide precise control of a thickness of a deposited film and a high uniformity of a deposited film.

In an example, aluminum-doped ZnO (Al:ZnO) electrode contact 30 may be formed on a first side of CdZnTe detector material 10 by atomic layer deposition (ALD) system 300. At 302, a first side of detector material 10 may be exposed to a first precursor 310. First precursor 310 may be used as a source of zinc, for example, first precursor 310 may be diethyl zinc (DEZ, $Zn(C_2H_5)_2$). Excess first precursor 310 may be removed from sample 330 by flowing an inert gas 317, such as nitrogen, over sample 330 to produce sample 332. Sample 332 may include a layer of first precursor 310 on a first side of detector material 10. At 304, sample 332 may be exposed to water 315. Excess water 315 may be removed from sample 332 by flowing inert gas 317 over sample 332. Water 315 may interact with layer of first precursor 310 (DEZ) on first side of sample 332 and form sample 334. Sample 334 may include layer 318 on first side of detector material 10. Layer 318 may be zinc oxide.

At 306, sample 334 may be exposed to a second precursor 320. Second precursor 320 may be used as a source for aluminum, for example, second precursor 320 may be trimethyl-aluminum (TMA, $Al(CH_3)_3$). Excess second precursor 320 may be removed from sample 334 by flowing inert gas 317 over sample 334. Second precursor 320 may interact with layer 318 (zinc oxide) of sample 334 and form sample 336. As shown at 308, sample 336 may include layer 322 on first side of detector material 10. Aluminum from precursor 320 may dope zinc oxide in layer 318 during exposure. Layer 322 may include aluminum-doped zinc oxide (Al:ZnO).

Exposers of first precursor 310, water, and second precursor 320 may all occur at a temperature of below 100 degrees Celsius, for example about 85 degrees Celsius. An exposure sequence of first precursor 310, water 315, and second precursor 320 may be repeated until the total deposited layer 322 has a thickness of about 250 nm. Electrode contact 30 may include layer 322. Electrode contact 30 may be attached to a first side of detector material 10 by ALD.

Detector material 10 may include a second side, opposite the first side attached to deposited electrode contact 30. Detector material 10 attached to electrode contact 30 may be inverted so that second side of detector material 10 is exposed to exposures during ALD. A second electrode contact 32 may subsequently be formed by ALD system 300 on the second side of detector material 10.

Example 1

An electrode contact 30 may be made by atomic layer deposition (ALD) technique for CdZnTe detectors. Aluminum-doped zinc oxide (Al:ZnO) conductive layers were deposited by atomic layer deposition (ALD) technique on CdZnTe wafers to produce electrode contacts for CdZnTe detectors with a Frisch-grid geometry. The deposition temperature during ALD was kept below 100° C. Diethyl Zinc (DEZ, $Zn(C_2H_5)_2$), Trimethyl Aluminum (TMA, $Al(CH_3)_3$) and $H_2O$ were used for source materials for Zn, Al and O, respectively. In an example, a 5×5×13.8 $mm^3$ Frisch grid detector was tested with gold electrode contacts 30 and then refabricated by ALD with Al:ZnO (AZO) electrode contacts 30.

Figure 4:
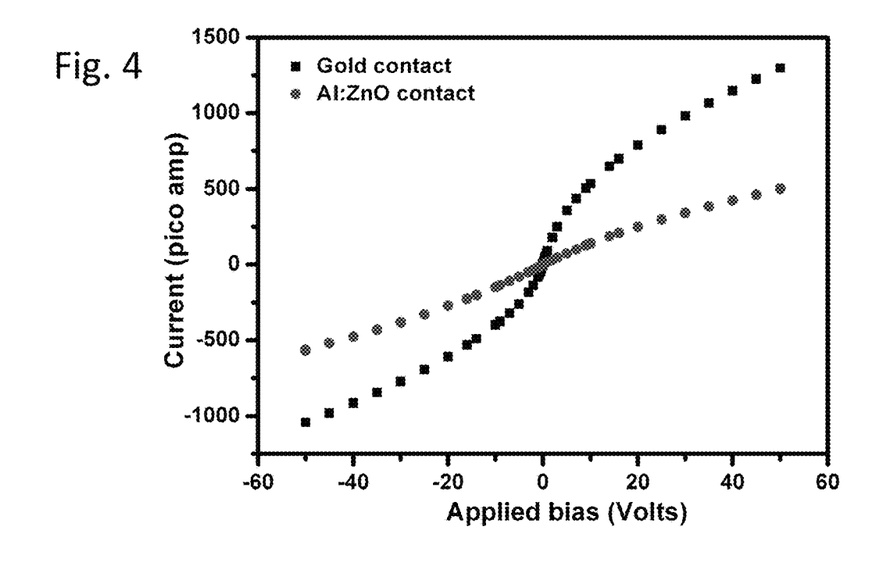
FIG. 4 is a graph illustrating current-voltage characteristics of a Frisch grid detector with gold and aluminum-doped zinc oxide (Al:ZnO) electrode contacts.

FIG. 4 is a graph illustrating current-voltage characteristics of a Frisch grid detector with gold and Al:ZnO electrode contacts, arranged in accordance with at least some embodiments presented herein. A 5×5×13.8 $mm^3$ Frisch grid detector was assembled with gold electrode contacts, and current-voltage characteristics were recorded. The gold electrode contacts were then replaced with Al:ZnO electrode contacts, and current-voltage characteristics were recorded for the replacement Al:ZnO electrode contacts. The Al:ZnO electrode contacts show lower dark current than the gold electrode contacts, indicating less thermal noise. The Al:ZnO electrode contacts displayed a superior linear current-voltage characteristic than the gold electrode contacts. The Al:ZnO electrode contacts also displayed equal or better detector response compared to the gold electrode contacts.

Example 2

Figure 5:
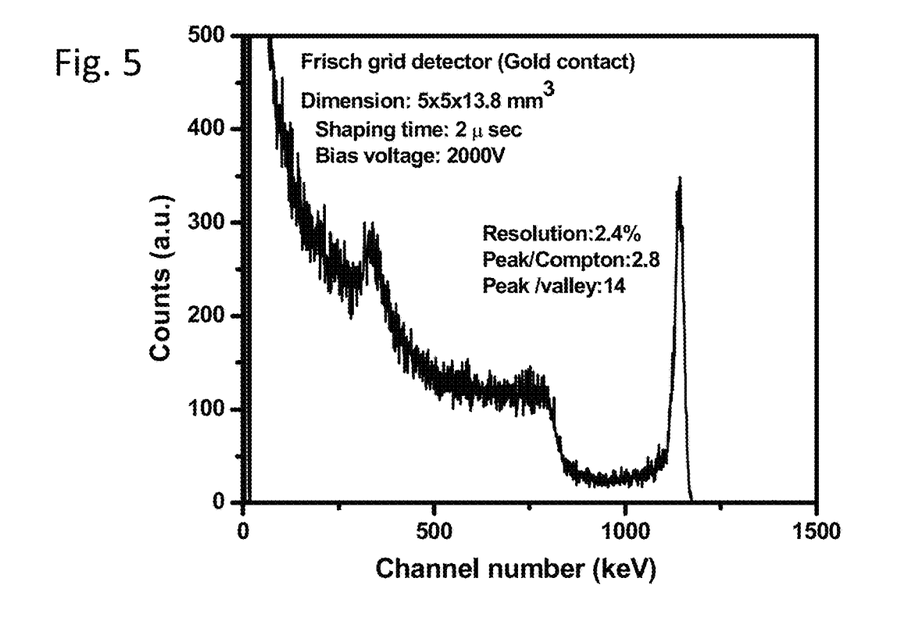
FIG. 5 is a graph illustrating a pulse height spectrum for a 5×5×13.8 $mm^3$ virtual Frisch grid detector with gold electrode contacts operating at room temperature for a $^{137}Cs$ source.
Figure 6:
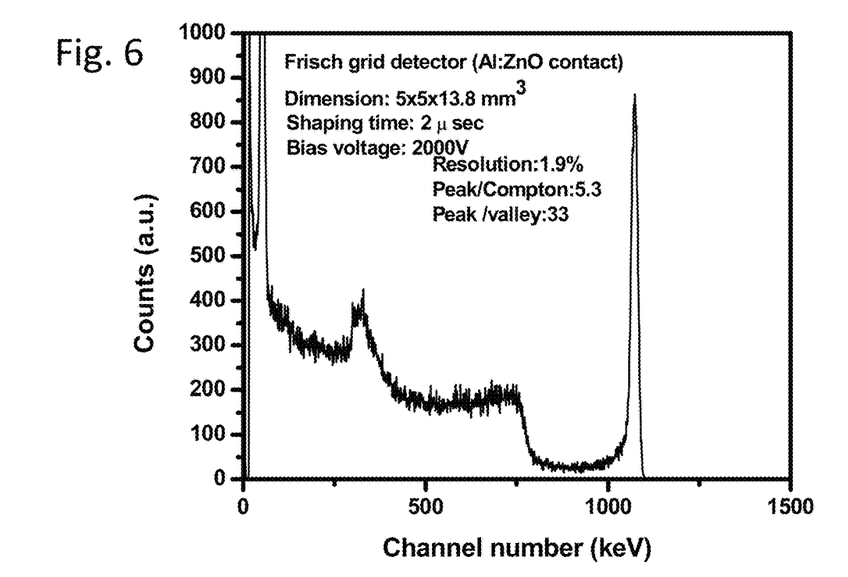
FIG. 6 is a graph illustrating a pulse height spectrum for a 5×5×13.8 $mm^3$ virtual Frisch grid detector with Al:ZnO electrode contacts operating at room temperature for a $^{137}Cs$ source.

Two 5×5×13.8 $mm^3$ Frisch grid detectors were assembled with gold electrode contacts and tested. The gold electrode contacts were then replaced with Al:ZnO electrode contacts, and the detectors were tested again. FIGS. 5 and 6 are graphs illustrating the resulting detector responses to a $^{137}Cs$ source.

FIG. 5 is a graph illustrating a pulse height spectrum for a 5×5×13.8 $mm^3$ virtual Frisch grid detector with gold electrode contacts operating at room temperature for a $^{137}Cs$ source. FIG. 6 is a graph illustrating a pulse height spectrum for a 5×5×13.8 $mm^3$ virtual Frisch grid detector with Al:ZnO electrode contacts operating at room temperature, about 22 degrees centigrade e for a $^{137}Cs$ source. A comparison of the pulse height spectra illustrated in FIGS. 5 and 6 show a higher count rate for the Al:ZnO electrode contacts of FIG. 6 as compared to the gold electrode contacts of FIG. 5. The energy resolutions, peak-to-Compton, and peak-to-valley ratios are superior for the Al:ZnO electrode contacts of FIG. 6 when compared to gold electrode contacts of FIG. 5, illustrating improved detector performance.

Figure 7:
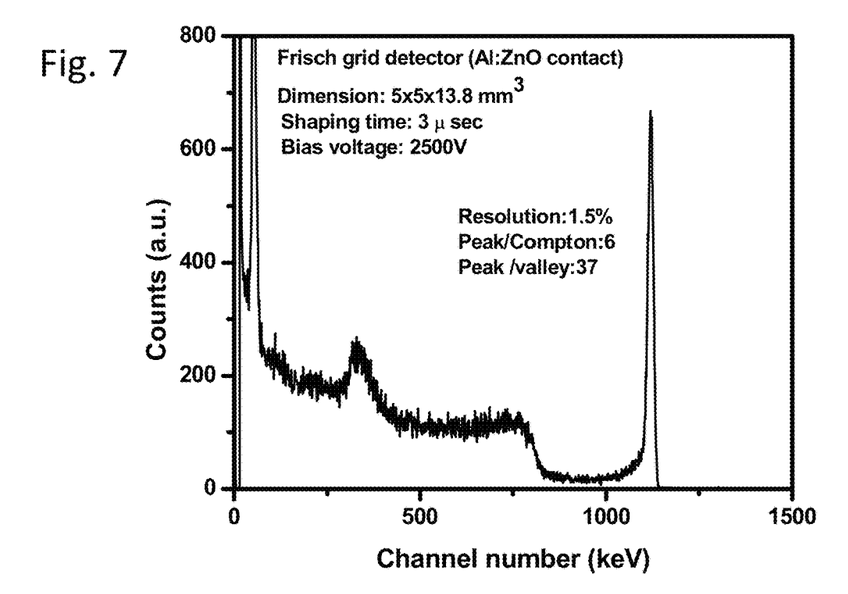
FIG. 7 is a graph illustrating a pulse height spectrum for a 5×5×13.8 $mm^3$ virtual Frisch grid detector with Al:ZnO electrode contacts at room temperature for a $^{137}$Cs source with an applied bias of 2500 V.

FIG. 7 is a graph illustrating a pulse height spectrum for a 5×5×13.8 $mm^3$ virtual Frisch grid detector with Al:ZnO electrode contacts operating at room temperature for a $^{137}Cs$ source at room temperature with an applied bias of 2500 V. FIG. 7 shows that in a 5×5×13.8 $mm^3$ virtual Frisch grid detector with Al:ZnO electrode contacts at a higher bias voltage; the energy resolution at 662 keV, peak-to-Compton, and peak-to-valley ratios were improved compared to the same detector with a lower applied bias.

Example 3

Figure 8:
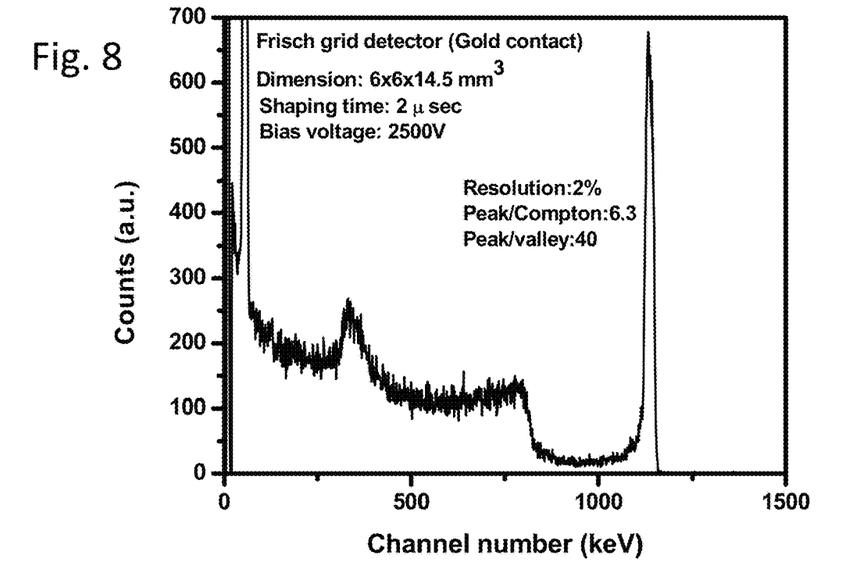
FIG. 8 is a graph illustrating a pulse height spectrum for a 6×6×14.5 mm$^3$ virtual Frisch grid detector with gold electrode contacts at room temperature for a $^{137}$Cs source.
Figure 9:
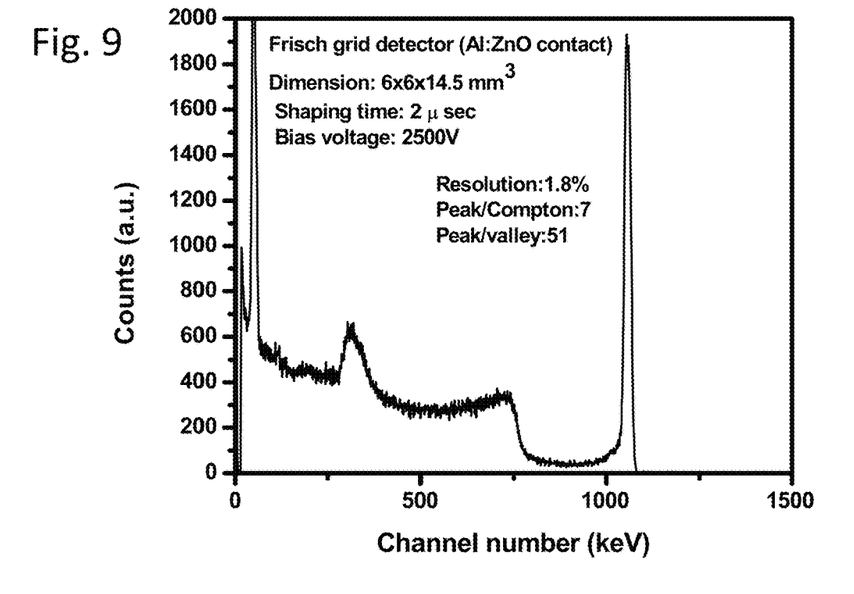
FIG. 9 is a graph illustrating a pulse height spectrum for a 6×6×14.5 mm$^3$ virtual Frisch grid detector with Al:ZnO electrode contacts at room temperature for a $^{137}$Cs source.

Two 6×6×14.5 mm 3 Frisch grid detectors were assembled with gold electrode contacts and tested. The gold electrode contacts were then replaced with Al:ZnO electrode contacts, and the detectors were tested again. FIGS. 8 and 9 are graphs illustrating the resulting detector responses to a $^{137}Cs$ source.

FIG. 8 is a graph illustrating a pulse height spectrum for a 6×6×14.5 $mm^3$ virtual Frisch grid detector with gold electrode contacts at room temperature for a $^{137}Cs$ source. FIG. 9 is a graph illustrating a pulse height spectrum for a 6×6×14.5 $mm^3$ virtual Frisch grid detector with Al:ZnO electrode contacts at room temperature for a $^{137}Cs$ source. As with the 5×5×13.8 $mm^3$ virtual Frisch grid detector, a comparison of the pulse height spectra for the 6×6×14.5 $mm^3$ virtual Frisch grid detector illustrated in FIGS. 8 and 9 show a higher count rate for the Al:ZnO electrode contacts of FIG. 6 as compared to the gold electrode contacts of FIG. 8. Likewise energy resolutions, peak-to-Compton, and peak-to-valley ratios are superior for the Al:ZnO electrode contacts of FIG. 9 when compared to gold electrode contacts of FIG. 8.

Example 4

The 5×5×13.8 $mm^3$ virtual Frisch grid detectors from Example 2 and the 6×6×14.5 $mm^3$ virtual Frisch grid detectors from Example 3 with Al:ZnO electrode contacts were integrated in a Frisch grid array coupled with an ASIC developed by Brookhaven National Laboratory, Upton, N.Y. and tested. FIGS. 10a, 10b, 11a, and 11b are graphs illustrating the resulting detector responses to a $^{137}Cs$ source before and after charge-loss correction for a bias of 2500 V.

Figure 10A:
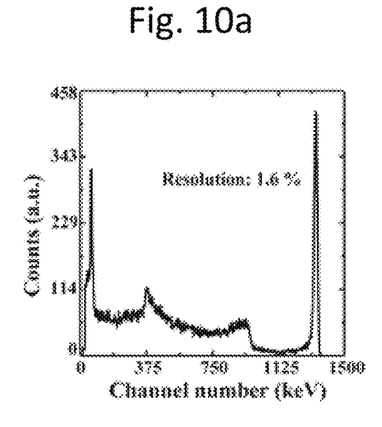
FIG. 10a is a graph illustrating a pulse height spectrum for a 5×5×13.8 mm$^3$ virtual Frisch grid detector with Al:ZnO electrode contacts for a $^{137}$Cs source under a bias of 2500 V.
Figure 10B:
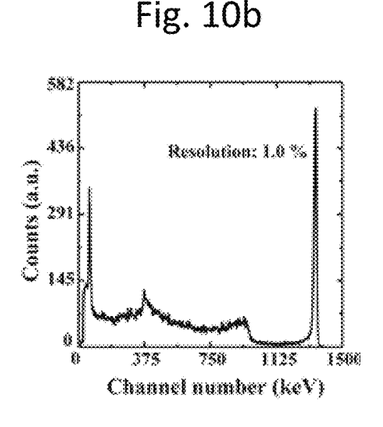
FIG. 10b is a graph illustrating a pulse height spectrum for a 5×5×13.8 mm$^3$ virtual Frisch grid detector with Al:ZnO electrode contacts for a $^{137}$Cs source after charge loss correction for a bias of 2500 V.

FIG. 10a is a graph illustrating a pulse height spectrum for a 5×5×13.8 $mm^3$ virtual Frisch grid detector with gold electrode contacts for a $^{137}Cs$ source under a bias of 2500 V. FIG. 10b is a graph illustrating a pulse height spectrum for a 5×5×13.8 $mm^3$ virtual Frisch grid detector with Al:ZnO electrode contacts for a $^{137}Cs$ source after charge-loss correction for a bias of 2500 V. FIGS. 10a and 10b show that the 5×5×13.8 $mm^3$ virtual Frisch grid detector with Al:ZnO electrode contacts of FIG. 10b perform better than the 5×5×13.8 mm³ virtual Frisch grid detector with gold electrode contacts of FIG. 10a. The 5×5×13.8 mm³ virtual Frisch grid detector with Al:ZnO electrode contacts of FIG. 10b shows increased detection sensitivity (higher counts).

Figure 11A:
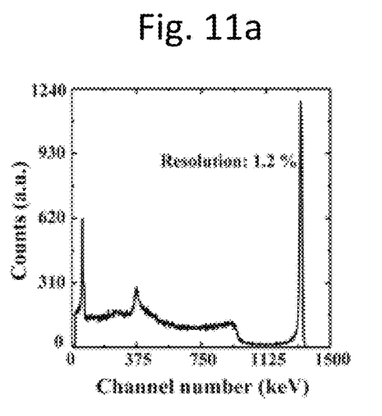
FIG. 11a is a graph illustrating a pulse height spectrum for a 6×6×14.5 mm$^3$ virtual Frisch grid detector with Al:ZnO electrode contacts for a $^{137}$Cs source under a bias of 2500 V.
Figure 11B:
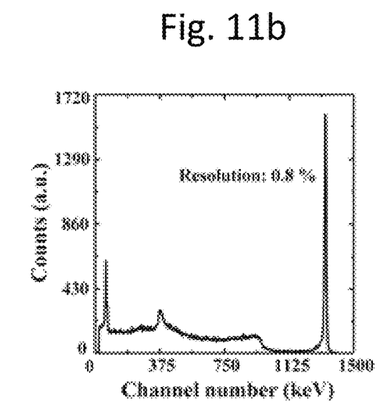
FIG. 11b is a graph illustrating a pulse height spectrum for a 6×6×14.5 mm$^3$ virtual Frisch grid detector with Al:ZnO electrode contacts for a $^{137}$Cs source after charge loss correction for a bias of 2500 V.

FIG. 11a is a graph illustrating a pulse height spectrum for a 6×6×14.5 mm³ virtual Frisch grid detector with gold electrode contacts for a $^{137}$Cs source under a bias of 2500 V. FIG. 11b is a graph illustrating a pulse height spectrum for a 6×6×14.5 mm³ virtual Frisch grid detector with Al:ZnO electrode contacts for a $^{137}$Cs source after charge loss correction for a bias of 2500 V. FIG. 11a and FIG. 11b show that the 6×6×14.5 mm³ virtual Frisch grid detector with Al:ZnO electrode contacts of FIG. 11b perform better than the 6×6×14.5 mm³ virtual Frisch grid detector with gold electrode contacts of FIG. 11a. The 6×6×14.5 mm³ virtual Frisch grid detector with Al:ZnO electrode contacts of FIG. 11b shows increased detection sensitivity (higher counts).

Among other possible benefits, a system in accordance with the present disclosure may produce an electrode contact material that is environmentally stable. The disclosed contact material may be mechanically stable with less interfacial stress between the ZnO layer and the detector material as compared to conventional metal contacts such as gold, indium, and platinum due to the closer thermal expansions coefficients between the Al:ZnO and the detector material. A lower stress at the interfacial region between the disclosed electrode contact and CdZnTe may result in less degradation (e.g., peeling, other disbands, or trapping of electrical carriers) of the detector performance with time, or in other words, the aging effect may be less than for detectors with metal contacts. The hardness of the disclosed electrode contact may be 8-20 times higher than for metal contacts to CdZnTe. As a result it may be possible to provide better mechanical stability and ease of handling during fabrication of the devices. The disclosed electrode contacts may also be less prone to scratches, which may contribute to a uniform electrical field and better charge collection in the detectors. Less material from the disclosed electrode contacts may defuse into the detector material due to its better chemical stability as opposed to metal electrode contacts. The disclosed electrode contacts may comprise an oxide layer of one of the native elements of CdZnTe, namely Zn; and thus the interfacial chemical stability may be improved in comparison with metal contacts. The disclosed electrode contact is a stable compound, so the reactivity between the present contact and the CdZnTe substrate may be comparatively low compared to most metals. This may reduce the likelihood that new defects will be formed at the contact/detector interface. Such defects can be detrimental to charge transport of electrical signal carriers across the interface and may contribute to a space-charge effect that can cause detector polarization and instability of the device over time.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A semiconductor radiation detector, the semiconductor radiation detector comprising:
    a semiconductor material for x-ray or gamma ray detection bounded by a first surface and a second surface, the first surface being opposite from the second surface, the semiconductor material comprising CdZnTe or CdZnTeSe, the semiconductor material effective to absorb x-ray or gamma ray radiation and induce a current pulse in response thereto;
    a first electrode contact and a second electrode contact respectively deposited on the first surface and the second surface respectively, each of the first electrode contact and the second electrode contact comprises aluminum-doped zinc oxide (Al:ZnO) and has a thickness exceeding about 200 nanometers,
    wherein the semiconductor radiation detector with the first electrode contact and the second electrode contact comprising Al:ZnO produces lesser dark current when bias voltage is applied across the first electrode contact and the second electrode contact during radiation detection than if the two electrode contacts comprised gold instead of said Al:ZnO.

2. The semiconductor radiation detector of claim 1, wherein the dark current is less than 500 pico amperes when the first electrode contact and said second electrode contact comprise said Al:ZnO.

3. The semiconductor radiation detector of claim 1, wherein the semiconductor material is CdZnTe.

4. The semiconductor radiation detector of claim 1, wherein the semiconductor material comprises CdZnTeSe.

5. A semiconductor radiation detector system-comprising:
    a semiconductor material for x-ray or gamma ray detection having a first surface and a second surface, the first surface being opposite from the second surface, the semiconductor material comprising CdZnTe or CdZnTeSe, the semiconductor material effective to absorb radiation and induce a current pulse in response thereto;
    a readout circuit; and
    at least one first electrode contact attached to the first surface and at least one second electrode contact attached to the second surface, wherein the first electrode contact and the second electrode contact are conductively connected to the readout circuit and wherein each of the first electrode contact and the second electrode contact comprises aluminum-doped zinc oxide (Al:ZnO) and has a thickness exceeding about 200 nanometers,
    wherein the semiconductor radiation detector with the first electrode contact and the second electrode contact comprising Al:ZnO produces lesser dark current when bias voltage is applied across the first electrode contact and the second electrode contact during radiation detection than if the two electrode contacts comprised gold instead of said Al:ZnO.

6. The semiconductor radiation detector system of claim 5, further comprising: a radiation generator, wherein the radiation generator is effective to direct radiation towards the semiconductor material, wherein the dark current is less than 500 pico amperes when the first electrode contact and said second electrode contact comprise said Al:ZnO.

7. The semiconductor radiation detector system of claim 5, further comprising:
    a radiation generator, wherein the radiation generator is effective to direct radiation in a radiation path towards the semiconductor material, wherein the semiconductor material is placed in a radiation zone of the radiation generator; and
    a gantry, wherein the gantry is a movable framework to support and maneuver a test sample to place the test sample in the radiation path between the radiation generator and the semiconductor material.

8. The semiconductor radiation detector system of claim 5, further comprising:
   a radiation generator, wherein the semiconductor material is placed in a radiation zone of the radiation generator and the radiation generator is effective to direct radiation in a radiation path towards the semiconductor material; and
   a gantry, wherein the gantry is a movable framework to support and maneuver the radiation generator to place a test sample in the radiation path between the radiation generator and the semiconductor material.

9. The semiconductor radiation detector system of claim 5, wherein the semiconductor material, the first electrode contact, and the second electrode contact form a detector unit, and the semiconductor radiation system further comprises:
   an array of detector units, wherein each detector unit is conductively connected to the readout circuit.

10. The semiconductor radiation detector system of claim 5, wherein the first electrode contact and the second electrode contact include the same material and form Ohmic connections between the first and second electrode contacts and the readout circuit.

11. The semiconductor radiation detector system of claim 5, wherein the first electrode contact includes a different material from the second electrode contact and the first and second electrode contacts form Schottky connections between the first and second electrode contacts and the readout circuit.

12. The semiconductor radiation detector system of claim 6, wherein semiconductor material is CdZnTe.

13. The semiconductor radiation detector system of claim 5, wherein the semiconductor material comprises CdZnTeSe.

14. A method of making a radiation detector, the method comprising:
   receiving a semiconductor material for x-ray or gamma ray detection having a first surface and a second surface, the first surface being opposite from the second surface, the semiconductor material comprising CdZnTe or CdZnTeSe, the semiconductor material effective to absorb radiation and induce a current pulse in response thereto;
   depositing aluminum-doped zinc oxide (Al:ZnO) as a first electrode contact on the first surface of the semiconductor material; and
   depositing aluminum-doped zinc oxide (Al:ZnO) as a second electrode contact on the second surface of the semiconductor material,
   wherein the aluminum-doped zinc oxide (Al:ZnO) on each of the first surface and the second surface has a thickness exceeding about 200 nanometers,
   wherein the semiconductor radiation detector with the first electrode contact and the second electrode contact comprising Al:ZnO produces lesser dark current when bias voltage is applied across the first electrode contact and the second electrode contact during radiation detection than if the two electrode contacts comprised gold instead of said Al:ZnO.

15. The method of making a radiation detector of claim 14,
   wherein said depositing of metal oxide on each of the first surface and the second surface is performed at a temperature less than 100 degrees centigrade and wherein the dark current is less than 500 pico amperes when the first electrode contact and said second electrode contact comprise said Al:ZnO.

16. The method of making a radiation detector of claim 14, wherein the semiconductor material is CdZnTe.

17. The method of claim 14, wherein the semiconductor material comprises CdZnTeSe.

18. A semiconductor radiation detector, the semiconductor radiation detector comprising:
   a semiconductor material for x-ray or gamma ray detection bounded by a first surface and a second surface, the first surface being opposite from the second surface, the semiconductor material comprising CdZnTe or CdZnTeSe, the semiconductor material effective to absorb radiation and induce a current pulse in response thereto; and
   a first electrode contact and a second electrode contact respectively deposited on the first surface and the second surface respectively, each of the first electrode contact and the second electrode contact includes Al:ZnO such that the combination of said semiconductor and said first and second electrode contacts have close thermal expansion coefficients,
   wherein each of said the first electrode contact and the second electrode contact has a thickness exceeding about 200 nanometers and wherein the semiconductor radiation detector with the first electrode contact and the second electrode contact comprising Al:ZnO produces lesser dark current when bias voltage is applied across the first electrode contact and the second electrode contact during radiation detection than if the two electrode contacts comprised gold instead of said Al:ZnO.

19. The semiconductor radiation detector of claim 18, wherein the semiconductor material is CdZnTe.

20. The semiconductor radiation detector of claim 18, wherein the dark current is less than 500 pico amperes when the first electrode contact and said second electrode contact comprise said Al:ZnO.

* * * * *